Nov. 19, 1957   D. M. JACKSON   2,813,729
SWIVEL JOINT SEAL WITH PRESSURE ACTUATED SEAL
Filed July 5, 1955
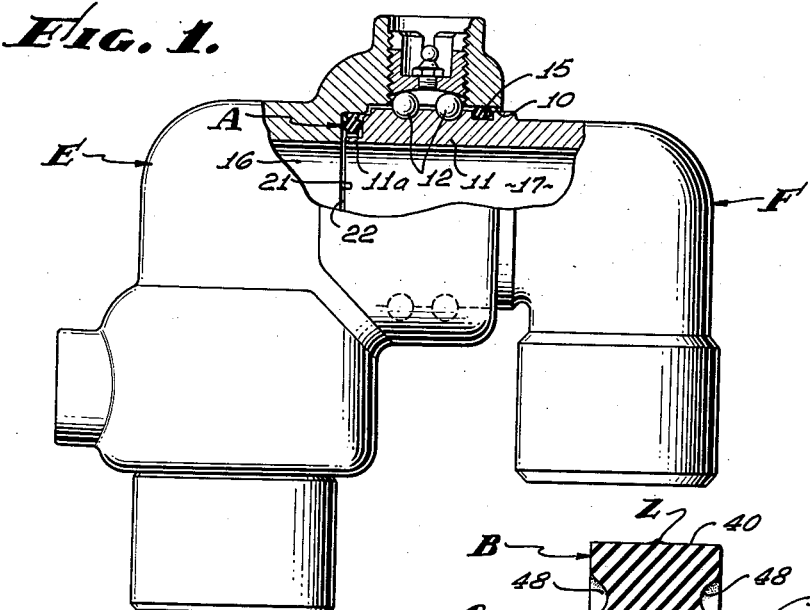
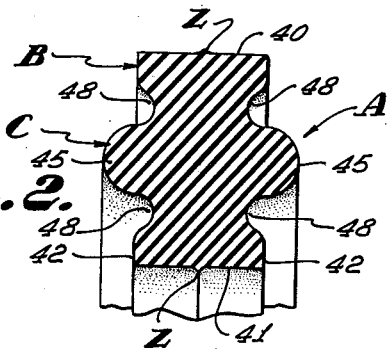
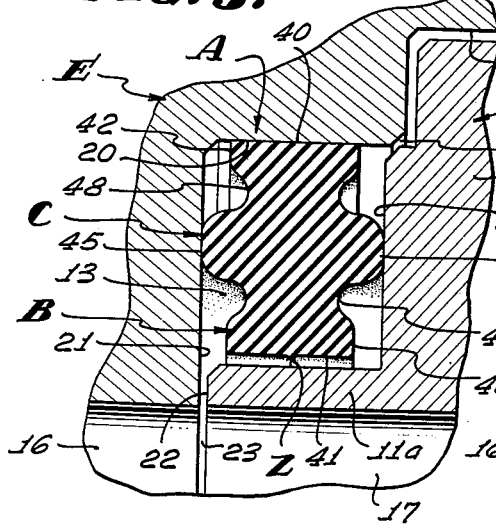 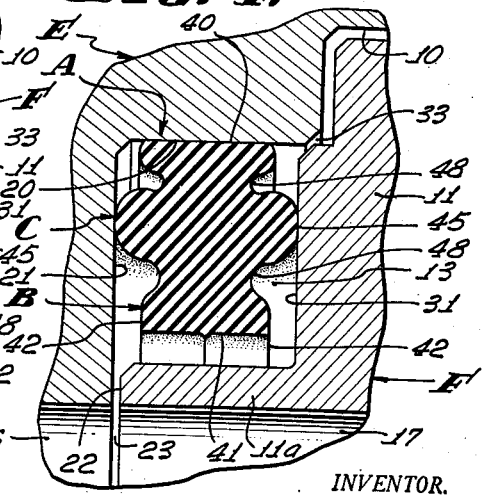
INVENTOR.
DONALD MANNING JACKSON
BY
*Maxwell & Maxwell*
AGENTS.

United States Patent Office 2,813,729
Patented Nov. 19, 1957

2,813,729

SWIVEL JOINT SEAL WITH PRESSURE ACTUATED SEAL

Donald M. Jackson, Fullerton, Calif., assignor to Chiksan Company, Brea, Calif., a corporation of California Application July 5, 1955, Serial No. 519,903

3 Claims. (Cl. 285—95)

This invention has to do with a seal and is more particularly concerned with a unitary sealing ring adapted to seal between flat, longitudinally spaced radially disposed sealing faces in a fluid handling structure.

There is, in use today, a type of fluid seal commonly referred to as an O-ring seal. O-ring seals are simple annular bodies formed of soft, resilient rubber, or rubber like material, and are round in cross sectional configuration. O-ring seals are generally engaged in annular chambers defined by a pair of interengaged members of a fluid handling structure and so that they are in slight compression between opposite sides of the chambers in which they are engaged and so that they establish fluid tight sealing engagement with the said sides of the chamber.

It has been found that O-ring seals will not function properly in structures such as fluid handling swivel joints, or the like, where the two members of the joint which establish the seal chamber, rotate relatively to each other and where working or running clearance must be maintained between the said members of the joint. It has been found that in such structures and where fluid pressure is exerted upon the O-rings, the O-rings extrude between the members of the structure which are spaced in working clearance and with the result that the O-rings are mutilated and rendered useless.

It has also been found that O-ring seals function properly only when engaged between two opposed sealing surfaces or walls of the seal chamber in which they are engaged, and that the other walls of the chamber in which they are engaged, which extend between sealing surfaces, must be spaced from the O-rings so as not to interfere with the desired deformation and flattening of the O-rings that occurs and when they are pressed between the sealing surfaces. Furthermore, it has been found that when O-ring seals are engaged between longitudinally spaced radially disposed sealing surfaces in a seal chamber in a swivel joint construction, or the like, and fluid pressure is exerted upon the rings from the interior of the joint, the O-rings are urged radially outward into engagement with the outer peripheral walls which are normally spaced from the O-rings so as to permit proper deformation of the rings in the chamber. O-rings, when acted upon in the manner set forth above, are stretched to increased circumferential extent and consequently are reduced in cross sectional area and are put in tension, with the result that they no longer properly seal on the radially disposed sealing surfaces.

For the various reasons set forth above, O-ring seals have only been employed in swivel connections where the sealing surfaces between which they are engaged are longitudinally disposed, and their employment in such structures where the sealing surfaces are radially disposed has been avoided.

In an effort to prevent O-ring type seals from shifting longitudinally in the sealing chambers in which they are engaged, and upon the application of fluid pressure thereon, and so they will not extrude between the parts of the structure which cooperate to establish the seal chamber, annular longitudinally projecting rib-like projections have been formed on the sides of the rings to engage the end walls of the said seal chambers and thereby to prevent the sealing parts of the rings from shifting longitudinally in the chamber to a position where they might be deformed or extruded between the parts of the structure in which they are engaged.

It has been found that O-ring type seals modified as above set forth, that is, provided with annular projections on their sides, function satisfactorily only when relatively low pressures are encountered and that when high pressures are encountered, that is, sufficient pressure to cause compression and deformation of the projections on the sealing rings, the projections on the rings act upon and urge the sealing portion of the rings out of proper configuration and sealing engagement on the sealing surfaces.

O-ring seals, as well as the modified O-ring type seals mentioned above, are formed as by molding, and due to their particular configuration, and as a result of the manner in which they must be molded, have flashings about their inner and outer peripheral sealing faces, which flashings materially effect the sealing ability and characteristics of the sealing rings.

It is an object of the present invention to provide a modified O-ring type seal adapted to seal between longitudially spaced, radially disposed sealing surfaces and provided with inner and outer radially projecting stop and anti-extrusion projections and portions.

It is another object of the present invention to provide a seal of the character referred to wherein annular recesses are provided in the projections where they join the sealing parts of the ring and which prevent deformation of the sealing parts of the ring when the seal is arranged in a structure with the projections thereon in compression.

A further object of the present invention is to provide a one piece sealing ring of the general character referred to which is formed by a single molding operation and on which the mold flashings occur around the projecting portions thereof and not on the sealing parts of the ring where they would interfere with the sealing characteristics of the seals.

The various objects and features of my invention will be fully understood from the following detailed description of a typical preferred form and application of my invention, throughout which description reference is made to the accompanying drawings, in which:

Fig. 1 is a side elevational view of a typical swing joint or swivel connection wherein the swivelly connected elements are sealed by means of a seal embodying the present invention, parts being broken away to show details of the construction. Fig. 2 is an enlarged detailed sectional view of the seal that I provide. Fig. 3 is an enlarged detailed sectional view of the portion of the structure shown in Fig. 1, showing the structure provided by the present invention in operating position. Fig. 4 is a view similar to Fig. 3, showing the seal acted upon by fluid pressure from within the joint.

The seal A provided by the present invention is in the nature of an O-ring type seal and is preferably a unitary seal molded of soft, resilient rubber, or rubber like material. The seal A is shown as including, generally, an annular body B and annular longitudinally projecting sealing members or parts C projecting from the sides of the body.

In accordance with the broader principles of the invention the sealing ring A as provided by the present invention can be employed in or applied to various structures. The sealing ring A is particularly applicable to swivel joints adapted to handle fluid under pressure, and, therefore, is shown in the drawings as applied to such a structure.

The particular swivel joint illustrated in the drawings is shown as including, two main sections E and F, the section E being a female section having a socket 10 entering it from one end while the section F is a male section having a pin portion 11 entering or extending into the socket. A suitable anti-friction bearing means rotatably supports the pin 11 in the socket 10 and holds the pin in the socket.

In the particular case illustrated, the bearings means includes an axially spaced annular series of balls 12 carried in registering grooves provided in the wall of the socket 10 and at the exterior of the pin 11.

A suitable seal 15 is shown provided in the socket 10 outward of the bearing means, and in the particular case illustrated, the socket has a reduced portion or counterbore 20 at its inner end terminating at a bottom 21, and the pin 11 has a reduced extension 11a entering the counterbore.

The parts just referred to establish an annular chamber 13 in the structure between the joint sections E and F and it is this chamber that carries or accommodates the seal A embodying the present invention. In the particular case illustrated, the joint sections E and F have central flow passages 16 and 17 of substantially the same diameter and in register with each other, so that fluid may be conducted through the joint. In the particular construction illustrated the terminal end 22 of the extension 11a terminates short of the bottom 21 of the counterbore 20 so that there is a flow passage 23 between the sections admitting fluid handled by the sections to the annular chamber 13 as clearly shown in Figs. 3 and 4 of the drawings.

The body B of the sealing ring A is shown as a continuous annular body formed of soft, resilient rubber, or the like, and has an outer peripheral face 40, an inner peripheral face 41 and end faces 42.

The outer peripheral face 40 of the body is preferably straight axially and round so that it slidably engages and fits the wall of the counterbore 20. The inner peripheral face of the body B is preferably straight axially and round so that it is engaged around, or receives the extension 12 on the pin 11. In practice, the inner peripheral face of the body need not slidably receive the extension 11a, but can, as illustrated in the drawings, be spaced slightly therefrom.

The body B is substantially less in longitudinal extent than the chamber 13 and is arranged in the chamber with its side faces spaced from the bottom 21 of the counterbore and the opposed radial face 31 of the pin 11. The end faces of the ring are preferably flat and radially disposed.

The sealing members C on the body B are simple annular projections on the end faces 42. The members C project from the side faces of the body intermediate the inner and outer peripheral faces thereof, and are, in the preferred carrying out of the invention, semi-circular in cross section so as to establish rounded, outer sealing surfaces 45.

The sealing members are of such size that they project longitudinally from the end faces 42 of the body B a sufficient extent for one of the members C to bridge the space between one of the end faces 42 and the bottom 21 of the counterbore and for the other member C to bridge the space between the other end face 42 and the radial face 31 of the pin section 11 and to establish sealing engagement therewith.

With the structure thus far set forth, it will be apparent that the sealing ring A that I provide establishes sealing engagement between the longitudinally spaced radially disposed bottom 21 of the counterbore and the radial face 31 of the pin section 11 and that the sealing members C being formed of soft, resilient rubber, or the like, and being semi-circular in cross sectional configuration, establish sealing engagement with the said bottom and radial face in substantially the same manner as an O-ring seal. It will also be apparent that upon application of fluid pressure on the seal A from within the joint construction, that is, the introduction of fluid into the seal chamber 13 through the opening 23 between the joint parts, the body A, with its outer peripheral face 40 in sliding engagement in the counterbore 20, prevents the sealing members C from shifting radially outward and towards the gap or opening 33 that occurs in the joint and through which the seal might otherwise extrude. It will also be apparent that the sealing member C engaging the radial face 31 of the pin section 11, in addition to sealing with said face 31, also holds and maintains the body B spaced from the opening 33 and prevents extruding of the body B thereinto.

The seal A that I provide is further provided with and is characterized by a pair of annular grooves 48 in each end face 42 of the body B. The grooves 48 occur at opposite ends of the sealing member C and extend into the body a substantial distance adjacent the said sealing members. In the particular case illustrated, the grooves are rounded so that they fair smoothly into the end faces 42 of the body and into the sealing surfaces 45 of the sealing members C.

The grooves 48 are provided in the seal where the body B and the sealing portions C thereof join so that deformation of the body, as by radial outward shifting thereof against the wall of the counterbore 21 and as by the application of fluid pressure thereon does not interfere with or effect the normal configuration which the sealing members C would take or assume if the body B were not included, that is, if the seal with a simple O-ring. The grooves further permit the sealing members C to shift and to change form in the structure, as by the application of mechanical and/or fluid pressure being exerted thereon without being undesirably influenced or affected by the body B connected thereto.

In Fig. 4 of the drawings, I have illustrated the seal A that I provide engaged in the particular joint construction described and as being acted upon by fluid pressure from within the joint. The function afforded by these grooves 48 is believed to be apparent from the above-noted illustration in the drawings. It is to be understood, however, that the above-noted figure in the drawings, is an extreme situation and that in practice the seal A would not be employed in situations where pressure sufficient to create such extreme deformation of the seal are frequently encountered.

It will be apparent from the foregoing that the seal that I provide can be advantageously formed in a two piece mold and so that the mold flashings resulting from its manufacture and indicated by the letters Z on the drawings, occur about the inner and outer faces 40 and 41 of the body, where they do not affect the sealing characteristics of the seal.

It will be apparent that should the seal A, provided by the present invention, be engaged in a structure wherein fluid pressure is exerted upon it from the outside, that is, from about its outer periphery, the inner peripheral portion of the body B will, or can be made to cooperate with the parts of the structure in which it is engaged in the same manner as the outer portion of the body does, and as set forth above.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A seal ring in an annular seal chamber between relatively movable sections of a swivel joint, comprising an annular body having cylindrical inner and outer peripheral faces, radially disposed end faces spaced apart a distance corresponding to the axial length of the cylindrical faces, and annular slidable sealing members substantially semi-circular in cross-section projecting axially from the end faces of the body, the sealing members being deformable radially of the seal ring in response to fluid pressure exerted against the sealing members, said seal chamber being formed by opposed annular radially disposed surfaces, one on each of said sections of the swivel joint, and a cylindrical surface on one of the sections extending substantially to said annular surface on the other of the sections, one of said peripheral faces of the seal ring engaging said cylindrical surface and being spaced from said annular surfaces, said sealing members being compressed between said annular surfaces and being spaced radially from said cylindrical surface.

2. A seal ring in an annular seal chamber between relatively movable sections of a swivel joint, comprising an annular body having a seal ring positioning face, parallel faces extending perpendicularly from said positioning face and spaced apart a distance corresponding to the length of the positioning face, and annular slidable sealing members projecting from the parallel faces of the body and having rounded end surfaces, the sealing members being deformable in a direction toward said positioning face in response to fluid pressure exerted thereagainst, said annular body having annular grooves entering the body at opposite sides of the sealing members to increase the deformability of the sealing members by allowing for relative shifting between the body and the sealing members, said seal chamber being formed by two spaced apart surfaces, one on each of said sections, and a third surface on one of said sections extending substantially to said spaced surface on the other section, said positioning face of the seal ring engaging said third surface of the seal chamber and being spaced from said spaced surfaces of the seal chamber, said sealing members being compressed between said spaced surfaces of the seal chamber and being spaced from said third surface of the seal chamber.

3. A unitary sealing ring of soft resilient rubber in an annular seal chamber between the relatively movable sections of a fluid handling structure, comprising an annular body symmetrical about a plane extending radially thereof and having inner and outer peripheral faces of predetermined length measured axially of the sealing ring, radially disposed end faces, and annular sealing members projecting from the end faces beyond the planes of the ends of the peripheral faces, the sealing members being semi-circular in cross section and having rounded outer slidable sealing surfaces, one of the peripheral faces of the body providing a support to locate the sealing ring and thereby limit radial shifting of the sealing members in response to fluid pressure imposed against the sealing members, said seal chamber being formed by opposed radial surfaces, one on each of said sections, and a cylindrical surface on one of said sections extending substantially to the radial surface on the other of said sections, one of said peripheral faces of the sealing ring engaging said cylindrical surface of the seal chamber and being spaced from said radial surfaces, said sealing members being compressed between said radial surfaces of the seal chamber and being spaced radially from said cylindrical surface of the seal chamber.

References Cited in the file of this patent

UNITED STATES PATENTS

| | | |
|---|---|---|
| 2,459,981 | Warren | Jan. 25, 1949 |
| 2,688,500 | Scott | Sept. 7, 1954 |
| 2,717,793 | Nenzell | Sept. 13, 1955 |